(12) United States Patent
Gondi

(10) Patent No.: US 10,459,822 B1
(45) Date of Patent: Oct. 29, 2019

(54) ITERATIVE STATIC ANALYSIS USING STORED PARTIAL RESULTS

(71) Applicant: Amazon Technologies, Inc., Seattle, WA (US)

(72) Inventor: Kalpana Gondi, Edison, NJ (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/587,172

(22) Filed: May 4, 2017

(51) Int. Cl.
*G06F 9/44* (2018.01)
*G06F 11/36* (2006.01)
*G06F 8/75* (2018.01)

(52) U.S. Cl.
CPC ............ *G06F 11/3604* (2013.01); *G06F 8/75* (2013.01)

(58) Field of Classification Search
CPC ............................... G06F 8/75; G06F 11/3604
USPC .................. 717/106–107, 127–133
See application file for complete search history.

(56) References Cited

U.S. PATENT DOCUMENTS

| 8,533,844 | B2* | 9/2013 | Mahaffey | G06F 21/564 709/203 |
| 9,720,806 | B1* | 8/2017 | Baars | G06F 8/70 |
| 9,830,335 | B1* | 11/2017 | Tibble | G06F 11/1451 |
| 2010/0287214 | A1* | 11/2010 | Narasayya | G06F 17/30306 707/805 |
| 2011/0173693 | A1* | 7/2011 | Wysopal | G06F 11/3612 726/19 |
| 2016/0179502 | A1* | 6/2016 | Cawley | G06F 8/54 717/121 |
| 2018/0018165 | A1* | 1/2018 | Kim | G06F 8/71 |

OTHER PUBLICATIONS

Dasgupta et al., "A Static Analysis Framework for Database Applications", 2009, IEEE, 12 pages.*

* cited by examiner

*Primary Examiner* — Ted T. Vo
(74) *Attorney, Agent, or Firm* — Quarles & Brady LLP

(57) ABSTRACT

Systems for performing a static analysis of one or more target software applications are provided. The static analysis is performed on a first source code, and the system identifies code snippets or other portions of the source code that are identifiable due to containing identifiable information, being associated with particular inputs and/or outputs, and the like. The system associates the code snippet with metadata describing the results of the static analysis for the first source code or for the code snippet. Subsequently, when the static analysis is requested for a second source code that uses the code snippet but does not include the source code for the code snippet, the system determines that the code snippet is used in the second source code and obtains the associated metadata to incorporate into the results of the static analysis of the second source code.

20 Claims, 6 Drawing Sheets

ITERATIVE STATIC ANALYSIS USING STORED PARTIAL RESULTS

BACKGROUND

Generally described, computing devices utilize a communication network, or a series of communication networks, to exchange data. Companies and organizations operate computer networks that interconnect a number of computing devices to support operations or provide services to third parties. The computing systems may be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies may allow a single physical computing device to host one or more instances of virtual machines that appear and operate as independent computing devices to users of a data center. The single physical computing device may create, maintain, delete, or otherwise manage virtual machines in a dynamic manner. In some scenarios, various computing devices may be associated with different combinations of operating systems or operating system configurations, virtualized hardware resources and software applications to enable a computing device to provide different desired functionalities, or to provide similar functionalities more efficiently. Further, virtual machines may themselves be partitioned into multiple isolated virtual systems, called "containers." The virtual machine controls allocation of resources such as processing power and memory, and each container has its own process and network space in which the container may, for example, execute software programs.

In such a system, a service provider may operate networks of systems to provide access to software using varying numbers of virtual machine resources. Such networks may be used to perform static analysis of source code for assessing the functionality and/or security of the source code. However, any time the source code is changed, the static analysis is typically completely redone. Moreover, static analysis typically generates a fairly large number of false positives, especially when a portion of the source code is not accessible to the static analysis software.

BRIEF DESCRIPTION OF THE DRAWINGS

The detailed description is set forth with reference to the accompanying figures. The use of the same reference numbers in different figures indicates similar or identical items or features.

DETAILED DESCRIPTION

In general, static analysis of an application may involve examining the source code of the application without executing the application. Static analysis of the application may help a developer of the application understand, for example, whether there are likely to be errors when the application is executed, whether the application conforms with certain standards, the likely behavior of the application, etc. However, static analysis is less useful when the source code of the application being analyzed includes references to other code that is not present within the source code, but that is used during execution of the application. Analysis of portions of the application for which the source code is not available may result in errors and/or low confidence that analysis is being performed on the likely behavior of that portion of the application. Further, it is often intensive in terms of computing resources and time to perform static analysis. This problem may become especially acute when iteratively changing the application during development, as the static analysis is typically performed on the entire application code whenever there is even a small change. Alternatively, the static analysis may not be performed at all due the large time investment in the analysis itself, and the time to review what are often false positives to attempt to rule out errors. Thus, methods that allow for reusing partial results from previous static analyses are desirable.

Figure 1:
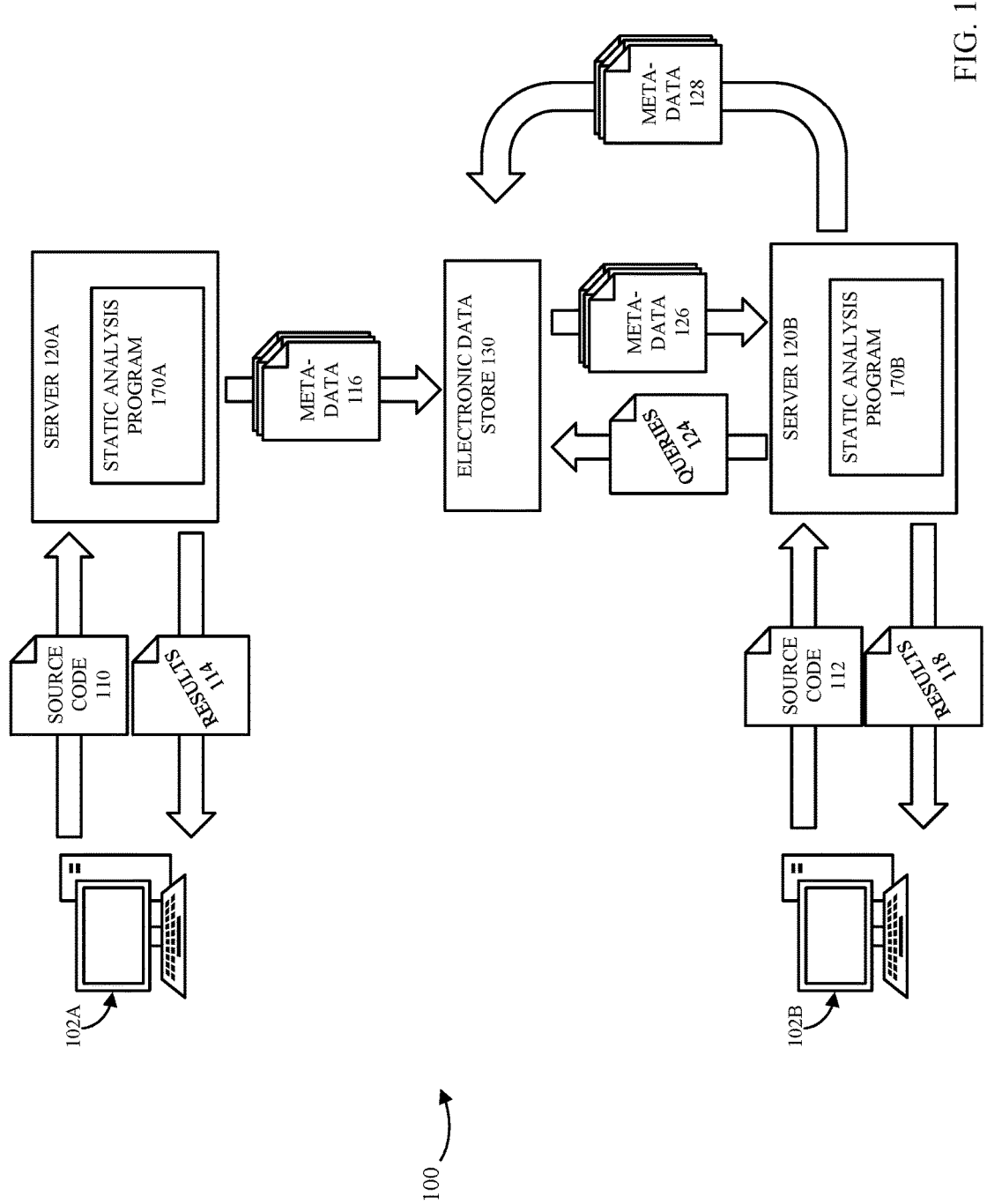
FIG. 1 is a diagram illustrating an exemplary system for iteratively performing a static analysis of source code using partial results from a previous analysis, in accordance with the present disclosure.

Referring to FIG. 1, embodiments of the present disclosure may operate within or upon a computing environment 100 in which users (e.g., developers, website visitors, etc.) of user computing devices 102A and 102B may submit source code (e.g., source code 110 and 112) for analysis to one or more servers (e.g., servers 120A and 120B) that may execute one or more static analysis programs (e.g., static analysis programs 170A and 170B). In some embodiments, the static analysis program 170A may generate results 114 of a static analysis of the first source code 110. Additionally or alternatively, the static analysis program 170A may generate first metadata 116 describing one or more aspects of the analysis performed; the first metadata 116 may be used by static analysis program 170A (or another static analysis program) in addition, or in lieu of, performing a new analysis of the first source code 110 or at least a portion of the second source code 112 that was analyzed as part of the first source code 110.

In general, the user computing devices 102A-B may be any computing device such as a desktop, laptop, mobile phone (or smartphone), tablet, kiosk, wireless device, Internet of Things ("IoT") device such as Internet appliances and connected devices, and other electronic devices. In addition, the user computing devices 102A-B may include web services running on the same or different data centers, where, for example, different web services may programmatically communicate with each other to perform one or more techniques described herein. For example, in various embodiments of the present system executing in the computing environment 100, each computing device 102A-B may itself be configured to perform the static analysis of the source code 110, 112 thereon. In one example, a computing device 102A, instead of a server 120A, may store and execute the static analysis program 170A; or, the computing device 102A may receive the static analysis program 170A from the server 120A, such as by downloading evaluation scripts (e.g., in a browser) from the server 120A that the user device 102A can execute to perform the static analysis locally on the source code 110. In such embodiments, the user devices 102A-B may not send the respective source code 110, 112 to the servers 120A-B, but may instead send some or all of the results 114, 118 generated from the static analysis to the servers 120A-B, along with the necessary information to characterize the portions of source code 110, 112 analyzed. Such information enables the servers 120A, 120B to generate the metadata 116, 128 described herein.

In accordance with the described embodiments, the present system may be integrated with, or may host or otherwise provide, or may communicate with (such as via one or more application programming interfaces (APIs)), an integrated development environment (IDE) or similar software development application or platform that enables software programmers to create, compile, interpret, execute, test, debug, and/or package source code for programs, libraries, and the like. In some embodiments, the system may coordinate with the IDE so that as the programmer creates and/or manages various discrete and/or interconnected portions of source code, the IDE generates event messages, such as requests to the system, to perform static analysis of affected portions. For example, a development project for a software application includes a function, written by the programmer, which is called in multiple different locations of the application's source code. When the function is first created, catalogued, registered, etc., by the programmer, the IDE notifies the system that the function is ready for static analysis. The system performs the static analysis of the function, generates metadata describing the function and the static analysis results as described below, and stores the metadata in a library (e.g., the electronic data store 130) for later use with similar functions. In another example, the development project includes a function that the programmer obtained from another source, which function previously had static analysis performed on it by the system. When the programmer registers the function in the IDE for use with the development project, the IDE notifies the system and the system retrieves the results of the previous static analysis for the function from the electronic data store 130 as described below. In some embodiments the IDE and/or the system may be executing from the user device 102A-B itself, while in other embodiments the IDE and/or the system may be based on and/or executing from one or more servers (e.g., the servers 120A-B or another application server) that are remote from the user devices 102A-B (i.e., a cloud-based system).

In some embodiments, the first metadata 116 generated based on the analysis of the first source code 110 may be stored such that it is accessible for later retrieval and use by the static analysis program 170A or another static analysis program (e.g., static analysis program 170B). For example, as shown in FIG. 1, a second user computing device 102B may submit second source code 112 to a second server 120B for analysis using a second static analysis program 170B, which may or may not be the same static analysis program used by the first server 120A. In such an example, the second source code 112 may contain portions of code that are identical to portions of the first source code 110 and/or may contain references to portions of first source code 110 without including the source code itself. In a more particular example, the second source code 112 may be an updated version of the first source code in which one or more portions have been changed, but one or more other portions have not changed. As another more particular example, the second source code 112 may reference one or more portions of the first source code 110, but may not include the source code itself. In such an example, all or portions of the first source code 110 may be a runtime library, an applet, etc., that is retrieved at runtime of the second source code 112, and is not included in the second source code 112 for static analysis.

In some embodiments, static analysis program 170A may generate the first metadata 116 based on its analysis of the first source code 110. In some embodiments, the first metadata 116 may include any suitable information that static analysis program 170A and/or another static analysis program (e.g., static analysis program 170B) may use in lieu of analyzing the source code itself. For example, for various discrete and identifiable portions of the first source code 110, the static analysis program 170A may generate metadata that may include one or more of: a signature or other identifying information of the code portion; one or more inputs used by the code portion; one or more outputs generated by the code portion; one or more relationships between the inputs and outputs; one or more changes to inputs performed by the static analysis program 170A; and/or, one or more corresponding changes in outputs resulting from corresponding changes in inputs. In a more particular example, the metadata may be structured as follows:

[semantic identifying information of code portion] {
    signature: Hash_of_the_code
    inputs: $i_1, i_2, \ldots, i_n$
    outputs: $o_1, o_2, \ldots, o_n$
    relationship: between inputs and outputs
    changes_to: inputs
    behavior: outputs
}

As used herein, a "portion" of the source code may be any number of lines, instructions, statements, or other elements of the source code that are sequenced or otherwise appear together, and that cooperate to perform a specific task or several tasks. Portions of source code may be discrete, in that they include or embody semantic or other identifying information that the present system uses to 1) identify the portion of source code as a portion on which the system can perform static analysis, and 2) tag (i.e., create an identifier for) metadata 116, 126, 128 generated to represent completed static analysis for the portion of source code, as described below. The system may, in various embodiments, be configured to process portions appearing in the source code at any degree of abstraction and at any stage of (pre)processing, including without limitation the following commonly understood types of code portions: routines, open or closed subroutines, methods, procedures, functions, macros, objects, code snippets, and the like.

The present system's operations are described below primarily using a code snippet as an example portion of source code, but it will be understood that like operations can be performed on any type of code portion. A snippet in particular is a portion of the source code that is not abstracted, but rather is composed of fixed set of plain-text instructions. A snippet is characterized as having a relatively high rate of re-use without modification; typically, a snippet is a ready-to-use block of code that reliably performs a task that is common to many software programs. As plain text, snippets can be inserted from a source document or a snippet library into source code using a simple copy-paste function. Snippets are particularly suited for the present methods of static analysis because the source code embodying a snippet is unlikely to change. Nevertheless, the system may update its library of previously analysis code portions by periodically performing the below-described analysis and metadata generation for any code portion, including a snippet, in case the static analysis methods are updated to include scanning of new vulnerabilities, new malware identification, etc.

In some embodiments, the server 120A executing the static analysis program 17A may cause the first metadata 116 generated by the static analysis program 170A to be stored in an electronic data store 130. In some embodiments, electronic data store 130 may be located in any suitable location. For example, electronic data store 130 may be located within server 120A. As another example, as described below in connection with FIG. 2A, electronic data store 130 may be located within a network-accessible services system. As yet another example, electronic data store 130 may be implemented as web-based network storage located remotely from server 120A (and/or server 120B). In some embodiments, any portion of the source code may be analyzed to determine metadata, such as function calls, snippets within a function call, a code block within a snippet, instructions that are associated with the source code, etc. In some embodiments, metadata may be available for one code snippet from a function call, while a second code snippet from the function call has changed and metadata is not available for the second code snippet. Through the user device 102A, a user may configure various parameters associated with the metadata (e.g., first metadata 116) generated from the analyzed portion(s) of the source code 110. In one embodiment, such configuration may be performed through an API accessible by the user device 102A and connecting the user device 102A to the server 120A or to another component of the system that receives user input and processes the user input to control the system's operations. In some embodiments the user may activate or deactivate the present static analysis methods, for all of its source code 110 or only portions thereof. Additionally, the user may configure the system to allow and/or prevent sharing of the static analysis results with other users of the system. Where only certain users of the system are permitted to retrieve the metadata 116 from the electronic data store 130, such permissions may be set at a user account level (i.e., identifying specific users), or at an organizational level (i.e., users belonging to a specific workgroup or domain, user devices submitting requests within a particular subnet, etc.), or at another suitable level of security.

In some embodiments, a second user computing device 102B may submit the second source code 112 to the server 120B (which may be the same or a different physical computing device than server 120A) for analysis by the static analysis program 170B (which may be the same installed copy of the same static analysis program as static analysis program 170A, a different copy of the same static analysis program installed on server 120A as static analysis program 170A, a different type of static analysis program, etc.). In some embodiments, source code 112 may be compiled code (sometimes referred to as "binaries") with metadata generated by analyzing the source code before compilation and/or identifying information that may be used to retrieve the metadata.

In some embodiments, as described below, the second server 120B may determine whether portions of the second source code 112 (and/or source code referenced by the second source code 112 but not included in the second source code) has already been analyzed (e.g., by the static analysis program 170A). In some embodiments, the second server 120B may use any suitable technique or combination of techniques to determine whether portions of the second source code 112 have already been analyzed. For example, the second server 120B may generate a signature for snippets of code in the second source code 112 (e.g., a hash of the snippet), and use the signature to query the electronic data store 130 for metadata stored in association with the hash. As another example, signatures (or other identifying information) for code snippets in the second source code 112 and/or referenced by the second source code may be included with the second source code 112, and the second server 120B may use these signatures to query the electronic data store for relevant metadata. As yet another example, the metadata for code snippets in the second source code 112 and/or referenced by the second source code 112 may be included with the second source code 112.

In some embodiments, as described above, the second server 120B may submit one or more queries 124 to the electronic data store 130 for metadata related to the second source code 112. In some embodiments, the queries 124 can be formatted in any suitable format, for example as a series of signatures (e.g., corresponding to a hash of the code snippet). In some embodiments, the electronic data store 130 may return second metadata 126 responsive to the queries 124. In some embodiments, the electronic data store may return a null result (or error, etc.) for any query for which a result was not found. In some embodiments, in addition to a hash value, other identifying information can be stored with the metadata, such as the name of a function to which the metadata corresponds, the name of a library that the function is included in, etc. In some embodiments, one or more portions of code, such as comments, which may vary without affecting the behavior of the code may be ignored (or otherwise unused) when generating the hash. In some embodiments, a query 124 may originate from, or be initiated by a command issued from, the user device 102B. For example, the user device 102B may connect through an API to either the server 120B or the electronic data store 130 itself, and may directly submit the query 124.

In some embodiments, the second static analysis program 170B may generate results 118 of a static analysis of the second source code 112, which may be based at least in part on the second metadata 126 corresponding to portions of the first source code 110. For example, the behavior of the first snippet may be inferred from the second metadata, and used in the analysis of a second snippet that uses an output of the first snippet as an input. In some embodiments, the static analysis program 170B may also generate third metadata 128 that may be used by static analysis program 170A, 170B, or another static analysis program, in addition to, or in lieu of, performing a new analysis of the second source code 112, or portions of other source code that includes the same code snippets as second source code 112.

Figure 2A:
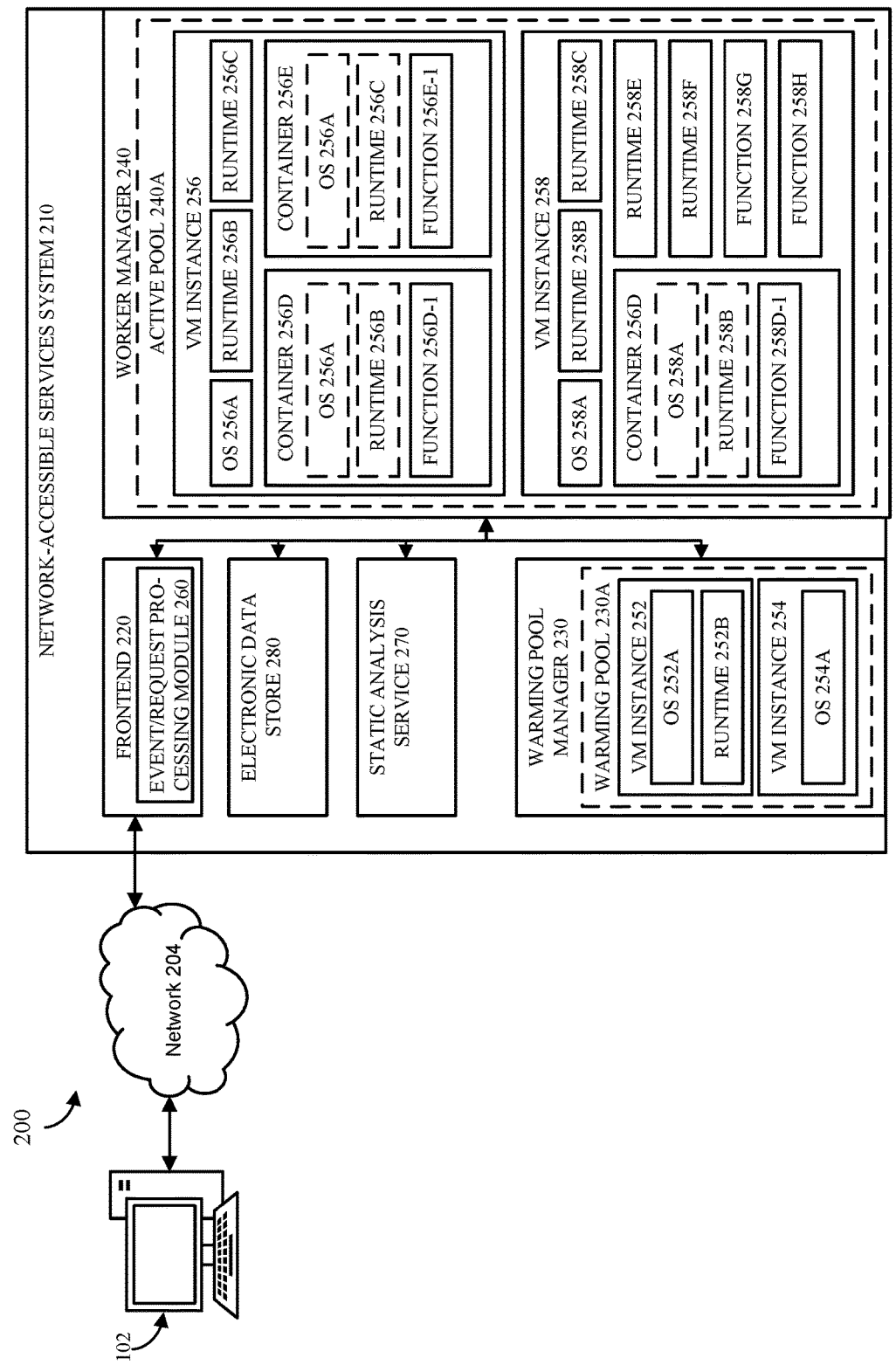
FIGS. 2A and 2B are diagrams illustrating exemplary systems for iteratively performing a static analysis of source code using partial results from a previous analysis in a distributed computing environment, in accordance with the present disclosure.

Referring to FIG. 2A, embodiments of the present disclosure may operate within or upon a computing environment 200 in which users (e.g., developers, website visitors, etc.) of user computing devices 102 run various program codes using the virtual computing resources provided by a network-accessible services system 210 allocated within the computing environment 200. The computing environment 200 may be one of any suitable type and/or configuration of a compute resource virtualization platform implemented on one or more physical computing devices. Non-limiting examples of a computing environment 200 include data centers, clusters of data centers organized into zones or regions, a public or private cloud environment, and the like.

The network-accessible services system 210 may provide the user computing devices 102 with one or more user interfaces, command-line interfaces ("CLI"), application programing interfaces ("API"), and/or other programmatic interfaces for generating and/or uploading source, analyzing the source code (e.g., submitting a request to perform a static analysis on the network-accessible services system 210), scheduling event-based jobs or timed jobs, tracking the user codes, and/or viewing other logging or monitoring information related to their requests and/or source code. Although one or more embodiments may be described herein as using a user interface, it should be appreciated that such embodiments may, additionally or alternatively, use any CLIs, APIs, or other programmatic interfaces. In some embodiments, one or more users (e.g., a developer, an owner, an administrator, etc.) associated with the static analysis of source code may use computing device 102 to interact with the network-accessible services system 210 to initiate and/or access results related to the static analysis. For example, a user of user computing device 102 may use user computing device 102 to generate the source code (e.g., source code 110 and/or 112), and/or provide the source code to the network-accessible services system 210. As another example, a user of user computing device 102 may use user computing device 102 to access results of the static analysis generated by the network-accessible services system 210, to access an analysis performed by another computing device, etc.

The user computing devices 102 may access the network-accessible services system 210 over a network 204. The network 204 may be any wired network, wireless network, or combination thereof. In addition, the network 204 may be a personal area network, local area network, wide area network, over-the-air broadcast network (e.g., for radio or television), cable network, satellite network, cellular telephone network, or combination thereof. For example, the network 204 may be a publicly accessible network of linked networks, possibly operated by various distinct parties, such as the Internet. In some embodiments, the network 204 may be a private or semi-private network, such as a corporate or university intranet. The network 104 may include one or more wireless networks, such as a Global System for Mobile Communications ("GSM") network, a Code Division Multiple Access ("CDMA") network, a Long Term Evolution ("LTE") network, or any other type of wireless network. The network 104 may use protocols and components for communicating via the Internet or any of the other aforementioned types of networks. For example, the protocols used by the network 104 may include Hypertext Transfer Protocol ("HTTP"), HTTPS, Message Queue Telemetry Transport ("MQTT"), Constrained Application Protocol ("CoAP"), and the like. Protocols and components for communicating via the Internet or any of the other aforementioned types of communication networks are well known to those skilled in the art and, thus, are not described in more detail herein.

The network-accessible services system 210 is depicted in FIG. 2A as operating in a distributed computing environment including several computer systems that are interconnected using one or more computer networks. The network-accessible services system 210 could also operate within a computing environment having a fewer or greater number of devices than are illustrated in FIG. 2A. Thus, the depiction of the network-accessible services system 210 in FIG. 2A should be taken as illustrative and not limiting to the present disclosure. For example, the network-accessible services system 210 or various constituents thereof could implement various Web services components, hosted or "cloud" computing environments, and/or peer-to-peer network configurations to implement at least a portion of the processes described herein.

Further, the network-accessible services system 210 may be implemented in hardware and/or software and may, for instance, include one or more physical or virtual servers implemented on physical computer hardware configured to execute computer executable instructions for performing various features that will be described herein. The one or more servers may be geographically dispersed or geographically co-located, for instance, in one or more data centers.

In the environment illustrated FIG. 2A, the computing environment 200 includes a network-accessible services system 210, which includes an electronic data store 280 (which may be configured to implement the electronic data store 130 described above in connection with FIG. 1), a frontend 220, a warming pool manager 230, and a worker manager 240. In the depicted example, virtual machine instances ("instances") 252, 254 are shown in a warming pool 230A managed by the warming pool manager 230, and instances 256, 258 are shown in an active pool 240A managed by the worker manager 240. The illustration of the various components within the network-accessible services system 210 is logical in nature and one or more of the components may be implemented by a single computing device or multiple computing devices. For example, the instances 252, 254, 256, 258 may be implemented on one or more physical computing devices in different various geographic regions. Similarly, each of the frontend 220, the warming pool manager 230, and the worker manager 240 may be implemented across multiple physical computing devices. Alternatively, one or more of the frontend 220, the warming pool manager 230, and the worker manager 240 may be implemented on a single physical computing device. In some embodiments, the network-accessible services system 210 may comprise multiple electronic data stores, multiple frontends, multiple warming pool managers, and/or multiple worker managers. Although four virtual machine instances are shown in the example of FIG. 2A, the embodiments described herein are not limited as such, and one skilled in the art will appreciate that the network-accessible services system 210 may comprise any number of virtual machine instances implemented using any number of physical computing devices. Similarly, although a single warming pool and a single active pool are shown in the example of FIG. 2A, the embodiments described herein are not limited as such, and one skilled in the art will appreciate that the network-accessible services system 210 may comprise any number of warming pools and active pools. Although the electronic data store 280 is shown as being part of network-accessible services system 210, the electronic data store may be implemented using any hardware and/or software, at any suitable location. For example, the electronic data store 280 may be implemented as part of a device that communicates with the user computing device 102 and/or the network-accessible services system 210 through network 204.

In the example of FIG. 2A, the network-accessible services system 210 is illustrated as being connected to the network 204. In some embodiments, any of the components within the network-accessible services system 210 may communicate with other components (e.g., the user computing devices 102, and/or other services that may communicate with the network-accessible services system 210) of the computing environment 200 via the network 204. In other embodiments, not all components of the network-accessible services system 210 are capable of communicating with other components of the computing environment 200. In one example, only the frontend 220 may be connected to the network 204, and other components of the network-accessible services system 210 may communicate with other components of the computing environment 200 via the frontend 220.

Computing devices may use the network-accessible services system 210 to access one or more services and/or execute one or more applications. For example, the user computing device 102 may submit a request to perform a static analysis on source code (e.g., source code 110), which may involve performing one or more functions that collectively execute the static analysis. One way of executing the functions is to acquire virtual machine instances from service providers who provide infrastructure as a service, configure the virtual machine instances to suit the needs of the static analysis, and use the configured virtual machine instances to execute the functions. The network-accessible services system 210 may handle the acquisition and configuration of compute capacity (e.g., containers, instances, etc., which are described in greater detail below) based on the request to perform the static analysis, and execute the static analysis service and/or application using the compute capacity. The network-accessible services system 210 may automatically scale up and down based on the volume by executing additional copies of the functions, thereby relieving the user computing device 102 from the burden of having to manage over-utilization (e.g., acquiring too little computing resources and suffering performance issues) or under-utilization (e.g., acquiring more computing resources than necessary to run the codes, and thus overpaying).

The frontend 220 receives and processes all the requests (sometimes in the form of event messages) to execute a static analysis on the network-accessible services system 210. In one embodiment, the frontend 220 serves as a front door to all the other services provided by the network-accessible services system 210. The frontend 220 processes the requests received from user computing device 102, and/or generated, for example, in response to events, and makes sure that the requests are properly authorized. For example, the frontend 220 may determine whether the user computing device 102 associated with the request is authorized to run the static analysis specified in the request. In some embodiments, the frontend 220 may receive requests and/or any other suitable information directed to a static analysis service 270, such as requests to initiate a static analysis on a particular corpus of source code. In some embodiments, requests and/or events may be processed by an event/request processing module 260. For example, the event/request processing module 260 may process an event message for a request to execute a static analysis, as described herein. In another embodiment, a separate polling service may be implemented, for example via a polling fleet configured to poll an event source or a message queue and perform at least an initial message conversion or processing to prepare the event message for further processing by the frontend 220 and/or another component of the network-accessible services system 210. In some embodiments, the event/request processing module 260 may periodically poll for event messages to be processed into requests to execute one or more functions. For example, the event/request processing module 260 may periodically access a message queue to determine and/or detect whether an event message has been placed in the message queue for processing by the network-accessible services system 210. In response to determining and/or detecting an event message in the message queue, the event/request processing module 260 may retrieve the message event from the message queue and initiate further processing of the event message. In some embodiments, the event/request processing module 260 may poll an event-triggering service directly rather than from a message queue. For example, some event-triggering services such as certain types of databases may support direct polling of event messages that need not necessarily rely on an intermediary message queue. In some embodiments, the event/request processing module 260 may manage the conversion of the event message (e.g., as accessed or retrieved from a message queue) into a request to execute one or more functions. Additionally, in some embodiments, the event message may be generated in a format representative of a remote procedure call to facilitate rapid conversion and/or immediate function invocation by the network-accessible services system 210 when the event message is processed. Such embodiments may enable a high degree of functional transparency and reduced latency between an auxiliary system responding to an event trigger and the network-accessible services system 210 processing the event message generated by the auxiliary system responsive to the event trigger. While the event/request processing module 260 is shown as part of the frontend 220, in some embodiments, all or a portion of the event/request processing module 260 may be implemented by other components of the network-accessible services system 210 and/or another computing device. For example, in some embodiments, another computing device in communication with the network-accessible services system 210 may include several modules or components that operate similarly to the modules and components illustrated as part of the frontend 220. In some embodiments, the frontend 220 may further include other components than are shown in FIG. 2A. In some embodiments, network-accessible services system 210 may include a static analysis service system 270 that may coordinate operations of a static analysis requested by a user of user computing device 102. For example, the static analysis service system 270 may receive the request and/or the source code, and may determine functions to be executed to perform the static analysis. In some embodiments, the static analysis service system 270 may request that such functions be performed by the VM instances of the network-accessible services system 210.

The functions as used herein may refer to any program code (e.g., a program, routine, subroutine, thread, etc.) written in a specific program language. In the present disclosure, the terms "function," "code," "user code," and "program code," may be used interchangeably. Such functions may be executed to achieve a specific task, for example, in connection with performing a static analysis. For example, the functions may be written in JavaScript (node.js), Java, Python, Ruby, C#, C++, etc. The request and/or corresponding event message may include source code to be analyzed, identifying information of metadata that can be used in the static analysis of the source code (and/or the location thereof), metadata that can be used in the static analysis of the source code, and one or more arguments to be used for performing the static analysis. For example, the user computing device 102 may provide the source code along with the request to execute the static analysis in response to the occurrence of one or more events. In another example, the request may identify previously uploaded source code (e.g., using the API for uploading the source code) by its name or its unique ID and one or more triggering conditions for performing the static analysis. In yet another example, the source code may be included in the request as well as uploaded in a separate location (e.g., the electronic data store 230, or another storage system internal to the network-accessible services system 210) prior to the request being received by the network-accessible services system 210. The network-accessible services system 210 may vary its code execution strategy based on where the source code is available at the time the request is processed.

The frontend 220 may receive the request to execute a static analysis in response to HTTPS requests from a computing device or in response to triggering events. Also, any information (e.g., headers and parameters) included in the HTTPS request may also be processed and utilized when executing the user code. As discussed above, any other protocols, including, for example, HTTP, MQTT, and CoAP, may be used to transfer a message containing the request to execute one or more functions to the frontend 220. In some embodiments, the frontend 220 may include a web service and/or may expose a web service HTTPS (or any other suitable protocol) API that may be used to submit requests to execute a static analysis, retrieve metadata related to source code to be analyzed, etc. The frontend 220 may also receive the request to execute a static analysis when an event is detected, such as an event that the user computing device 102 has registered to trigger automatic request generation. For example, the user computing device 102 may have registered a timed job (e.g., perform a static analysis every 24 hours). In such an example, when the scheduled time arrives for the timed job, the request to execute the static analysis may be sent to the frontend 220. In another example, the frontend 220 may include or have access to a queue of incoming requests, and when the request to execute a static analysis queued by the user computing device 102 is removed from the work queue of the network-accessible services system 210, the frontend 220 may process the request. In yet another example, the request may originate from another component within the network-accessible services system 210 or other servers or services not illustrated in FIG. 2A.

A request to execute one or more functions sent by the user computing device 102 may specify one or more third-party libraries (including native libraries) to be used in the static analysis of the source code. In one embodiment, the request includes a package file (for example, a compressed file, a ZIP file, a RAR file, etc.) containing the source code and any libraries (and/or identifications of storage locations thereof). In some embodiments, the request includes metadata that indicates, the language in which the source code is written, the user computing device 102 associated with the request, and/or the computing resources (e.g., memory, etc.) to be reserved for executing the static analysis. For example, the source code may be provided with the request, previously uploaded, provided by the network-accessible services system 210 (e.g., standard libraries), and/or provided by third parties.

In some embodiments, the network-accessible services system 210 may include multiple frontends 220. In such embodiments, a load balancer may be provided to distribute the incoming requests and/or event messages to the multiple frontends 220, for example, in a round-robin fashion.

The warming pool manager 230 ensures that virtual machine instances are ready to be used by the worker manager 240 when the network-accessible services system 210 receives a request to execute a static analysis using the network-accessible services system 210. In the example illustrated in FIG. 2A, the warming pol manager 230 manages the warming pool 230A, which is a group (sometimes referred to as a pool) of pre-initialized and pre-configured virtual machine instances that may be used to service incoming requests. In some embodiments, the warming pool manager 230 causes virtual machine instances to be booted up on one or more physical computing machines within the network-accessible services system 210 and added to the warming pool 230A prior to receiving a request to execute a static analysis that will be executed on the virtual machine instance. In other embodiments, the warming pool manager 230 communicates with an auxiliary virtual machine instance service to create and add new instances to the warming pool 230A. For example, the warming pool manager 230 may cause additional instances to be added to the warming pool 230A based on the available capacity in the warming pool 230A to service incoming requests. In some embodiments, the warming pool manager 230 may utilize both physical computing devices within the network-accessible services system 210 and one or more virtual machine instance services to acquire and maintain compute capacity that may be used to service code execution requests received by the frontend 220. In some embodiments, the network-accessible services system 210 may comprise one or more logical knobs or switches for controlling (e.g., increasing or decreasing) the available capacity in the warming pool 230A. For example, a system administrator may use such a knob or switch to increase the capacity available (e.g., the number of pre-booted instances) in the warming pool 230A during peak hours. In some embodiments, virtual machine instances in the warming pool 230A may be configured based on a predetermined set of configurations independent from a specific request to execute one or more functions. The predetermined set of configurations may correspond to various types of virtual machine instances to execute user codes. The warming pool manager 230 may optimize types and numbers of virtual machine instances in the warming pool 230A based on one or more metrics related to current or previous user code executions.

As shown in FIG. 2A, instances may have operating systems ("OS") and/or language runtimes loaded thereon. For example, the warming pool 230A managed by the warming pool manager 230 comprises instances 252, 254. The instance 252 includes an OS 252A and a runtime 252B. The instance 254 includes an OS 254A. In some embodiments, the instances in the warming pool 230A may also include containers (which may further contain copies of operating systems, runtimes, user codes, etc.), which are described in greater detail below. Although the instance 252 is shown in FIG. 2A to include a single runtime, in other embodiments, the instances depicted in FIG. 2A may include two or more runtimes, each of which may be used for running a different user code. In some embodiments, the warming pool manager 130 may maintain a list of instances in the warming pool 230A. The list of instances may further specify the configuration (e.g., OS, runtime, container, etc.) of the instances.

In some embodiments, the virtual machine instances in the warming pool 230A may be used to serve any requests from any suitable computing device. In one embodiment, all the virtual machine instances in the warming pool 230A are configured in the same or substantially similar manner. In another embodiment, the virtual machine instances in the warming pool 230A may be configured differently to suit the needs of different users. For example, the virtual machine instances may have different operating systems, different language runtimes, and/or different libraries loaded thereon. In yet another embodiment, the virtual machine instances in the warming pool 230A may be configured in the same or substantially similar manner (e.g., with the same OS, language runtimes, and/or libraries), but some of those instances may have different container configurations. For example, two instances may have runtimes for both Python and Ruby, but one instance may have a container configured to run Python code, and the other instance may have a container configured to run Ruby code. In some embodiments, multiple warming pools 230A, each having identically-configured virtual machine instances, are provided.

The warming pool manager 230 may pre-configure the virtual machine instances in the warming pool 230A, such that each virtual machine instance is configured to satisfy at least one of the operating conditions that may be requested or specified by the request to execute one or more functions on the network-accessible services system 210. In one embodiment, the operating conditions may include program languages in which the source code may be written. For example, such languages may include Java, JavaScript, Python, Ruby, and the like. In some embodiments, the set of languages that the functions may be written in may be limited to a predetermined set (e.g., set of 4 languages, although in some embodiments sets of more or less than four languages are provided) in order to facilitate pre-initialization of the virtual machine instances that may satisfy requests to execute static analysis. For example, operating conditions specified in the request may include: the amount of compute power to be used for processing the request; the type of the request (e.g., HTTP vs. a triggered event); the timeout for the request (e.g., threshold time after which the request may be terminated); security policies (e.g., may control which instances in the warming pool 230A are usable by which user); etc.

The worker manager 240 manages the instances used for servicing incoming requests to execute functions. In the example illustrated in FIG. 2A, the worker manager 240 manages the active pool 240A, which is a group (sometimes referred to as a pool) of virtual machine instances that are currently assigned to one or more users. Although the virtual machine instances are described here as being assigned to a particular user, in some embodiments, the instances may be assigned to a group of users, such that the instance is tied to the group of users and any member of the group may utilize resources on the instance. For example, the users in the same group may belong to the same security group (e.g., based on their security credentials) such that executing requests from the user computing device 102 in a container on a particular instance after another code has been executed in another container on the same instance does not pose security risks. Similarly, the worker manager 240 may assign the instances and the containers according to one or more policies that dictate which requests may be executed in which containers and which instances may be assigned to which users. An example policy may specify that instances are assigned to collections of users who share the same account (e.g., account for accessing the services provided by the network-accessible services system 210). In some embodiments, requests associated with the group of user computing devices may share the same containers (e.g., if the functions associated therewith are identical). In some embodiments, the worker manager 240 may include an instance allocation unit for finding compute capacity (e.g., containers) to service incoming requests to execute static analyses.

As shown in FIG. 2A, instances may have OSs, language runtimes, and containers. The containers may have individual copies of the OS and the runtimes and functions loaded thereon. In the example of FIG. 2A, the active pool 240A managed by the worker manager 240 includes the instances 256, 258. The instance 256 has an OS 256A, runtimes 256B, 256C, and containers 256D, 256E. The container 256D includes a copy of the OS 256A, a copy of the runtime 256B, and a copy of a function 256D-1. The container 256E includes a copy of the OS 256A, a copy of the runtime 256C, and a copy of a function 256E-1. The instance 258 has an OS 258A, runtimes 258B, 258C, 258E, 258F, a container 258D, and functions 258G, 258H. The container 258D has a copy of the OS 258A, a copy of the runtime 258B, and a copy of a function 258D-1. As illustrated in FIG. 2A, instances may have functions loaded thereon, and containers within those instances may also have functions loaded therein. In some embodiments, the worker manager 240 may maintain a list of instances in the active pool 240A. The list of instances may further specify the configuration (e.g., OS, runtime, container, etc.) of the instances. In some embodiments, the worker manager 240 may have access to a list of instances in the warming pool 230A (e.g., including the number and type of instances). In other embodiments, the worker manager 240 requests compute capacity from the warming pool manager 230 without having knowledge of the virtual machine instances in the warming pool 230A.

In the example illustrated in FIG. 2A, functions are executed in isolated compute systems referred to as containers (e.g., containers 256D, 256E, 258D). Containers are logical units created within a virtual machine instance using the resources available on that instance. For example, the worker manager 240 may, based on information specified in the request to execute one or more functions, create a new container or locate an existing container in one of the instances in the active pool 240A and assign the container to the request to handle the execution of the function associated with the request. In one embodiment, such containers are implemented as Linux containers. The virtual machine instances in the active pool 240A may have one or more containers created thereon and have one or more functions that may be used to perform a network vulnerability scan loaded thereon (e.g., either in one of the containers or in a local cache of the instance). Each container may have credential information made available therein, so that functions being executed on the container have access to whatever the corresponding credential information allows them to access.

Once a request has been successfully processed by the frontend 220, the worker manager 240 finds capacity to service the request to execute user code on the network-accessible services system 210. For example, if there exists a particular virtual machine instance in the active pool 240A that has a container with the same user code loaded therein (e.g., code 256D-1 shown in the container 256D), the worker manager 240 may assign the container to the request and cause the function to be executed in the container. Alternatively, if the function is available in the local cache of one of the virtual machine instances (e.g., functions 258G, 258H, which are stored on the instance 258 but do not belong to any individual containers), the worker manager 240 may create a new container on such an instance, assign the container to the request, and cause the function to be loaded and executed in the container.

If the worker manager 240 determines that the function associated with the request is not found on any of the instances (e.g., either in a container or the local cache of an instance) in the active pool 240A, the worker manager 240 may determine whether any of the instances in the active pool 240A is currently associated with the request and has compute capacity to handle the current request. If there is such an instance, the worker manager 240 may create a new container on the instance and assign the container to the request. Alternatively, the worker manager 240 may further configure an existing container on the instance assigned to execute functions associated with the network vulnerability scan, and assign the container to the request. For example, the worker manager 240 may determine that the existing container may be used to execute a particular function if a particular library demanded by the currently requested static analysis is loaded thereon. In such a case, the worker manager 240 may load the particular library and the function onto the container and use the container to execute the function.

If the active pool 240A does not contain any instances currently assigned to the user computing device, the worker manager 240 pulls a new virtual machine instance from the warming pool 230A, assigns the instance to the user computing device 102 associated with the request, creates a new container(s) on the instance, assigns the container(s) to the request, and causes a function(s) to be performed as part of the static analysis to be downloaded and executed on the container(s). In some embodiments, program code for executing the function(s) may be downloaded from an auxiliary service.

In some embodiments, electronic data store 280 may be used to store results generated during the static analysis by the network-accessible services system 210. For example, information that is generated as a result of a static analysis executed by the network-accessible services system 210 may be stored in the electronic data store 280 in association with identifying information of the source code and/or user associated with the user computing device. As another example, metadata generated based on the results of the static analysis performed by the network-accessible services 210 may be stored in the electronic data store 280 in association with identifying information of the code snippet (s) to which the metadata is related. In some embodiments, the electronic data store 280 may store the information using any suitable data structure, such as a relational database, a non-relational database, or any other suitable data structure. In some embodiments, storing the information in electronic data store 280 may facilitate performing a static analysis more efficiently and/or more reliably by using the metadata generated in a previous analysis when identical code is present in the source code and/or when the source code does not include the code that was previously analyzed, but uses the code at runtime.

Once the worker manager 240 locates one of the virtual machine instances in the warming pool 230A that may be used to serve the request to execute one or more functions, the warming pool manager 230 or the worker manger 240 takes the instance out of the warming pool 230A and assigns it to the user computing device 102 associated with the request. The assigned virtual machine instance is taken out of the warming pool 230A and placed in the active pool 240A. In some embodiments, once the virtual machine instance has been assigned to the user computing device 102, the same virtual machine instance cannot be used to service requests of any other user. This provides security benefits to users by preventing possible co-mingling of resources. Alternatively, in some embodiments, multiple containers belonging to different users (or assigned to requests associated with different users) may co-exist on a single virtual machine instance. Such an approach may improve utilization of the available compute capacity.

In some embodiments, the network-accessible services system 210 may maintain a separate cache in which functions are stored to serve as an intermediate level of caching system between the local cache of the virtual machine instances and a web-based network storage (e.g., accessible via the network 204).

After a particular function has been executed, the worker manager 240 may tear down the container used to execute the function to free up the resources it occupied to be used for other containers in the instance. Alternatively, the worker manager 240 may keep the container running to use it to service additional requests from the same user. For example, if another request associated with the same function that has already been loaded in the container, the request may be assigned to the same container, thereby eliminating the delay associated with creating a new container and loading the function in the container. In some embodiments, the worker manager 240 may tear down the instance in which the container used to execute the function was created. Alternatively, the worker manager 240 may keep the instance running to use it to service additional requests from the same user. The determination of whether to keep the container and/or the instance running after the user code is done executing may be based on a threshold time, the type of the user, average request volume of the user, and/or other operating conditions. For example, after a threshold time has passed (e.g., 5 minutes, 30 minutes, 1 hour, 24 hours, 30 days, etc.) without any activity (e.g., running of the code), the container and/or the virtual machine instance is shut down (e.g., deleted, terminated, etc.), and resources allocated thereto are released. In some embodiments, the threshold time passed before a container is torn down is shorter than the threshold time passed before an instance is torn down.

In some embodiments, the network-accessible services system 210 is adapted to begin execution of the function shortly after it is received (e.g., by the frontend 220).

The worker manager 240 may include an instance allocation unit for finding compute capacity (e.g., containers) to service incoming code execution requests and a user code execution module for facilitating the execution of user codes on those containers.

Figure 2B:
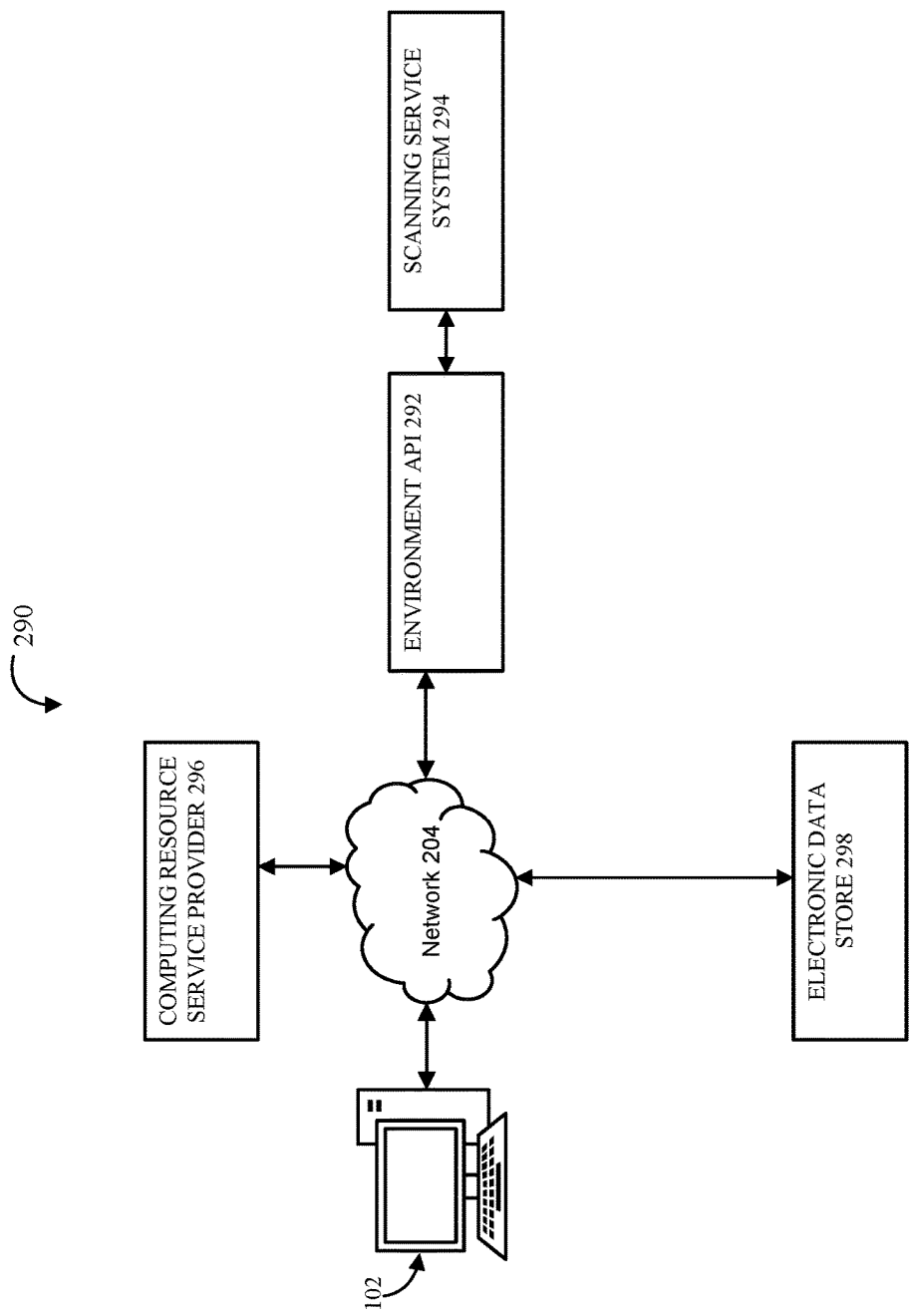

Referring to FIG. 2B, embodiments of the present disclosure may operate within or upon a computing environment 290 in which users may use user computing devices 102 to request that a computing resource service provider 296 execute one or more programs and/or request analysis of source code by a scanning service system 294. In some embodiments, the computing resource service provider may provide, or otherwise be compatible with, an environment API 292 through which a user computing device 102 can connect to the scanning service system 294. For example, the API 292 may be a web-based interface implemented on a web server of the computing resource service provider 296; one or more user interfaces may be transmitted to the user computing device 102 and displayed thereon, enabling the user of the user computing device 102 to provide settings, commands, software packages, and other user input, to the computing resource service provider 296. Such user input may be used to submit source code and/or any other suitable information to the computing resource service provider 296 and/or to the scanning service system 294.

Within the computing environment 290, the scanning service system 294 may perform static analysis of source code and, in some embodiments, any other suitable scans such as security scans, network vulnerability scans, etc. In some embodiments, the scanning service system 294 may obtain and analyze source code (e.g., source code 110, source code 112, etc.). The scanning service system 294, which may be implemented by physical hardware, may be used by the computing resource service provider 296 to provide static analysis services to users, security risk information to user and/or other services of the computing resource service provider 296. The scanning service system 294 may include or be implemented on one or more computing devices. In some embodiments, the scanning service system 294 may be a component of the computing resource service provider 296, and may be implemented on one or more server computers. In some embodiments, the scanning service system 294 may be implemented on one or more computing devices (not shown) outside of the computing resource service provider 296. The scanning service system 294 may access the computing resource service provider 296, via the API 292 or another API. In some embodiments, the scanning service system 294 may use the API 292 to provide user interfaces to the user device 102, enabling the user to configure settings of the scanning service system 294.

The scanning service system 294 may be configured to perform static analysis and produce results based at least in part on source code provided by users of the user computing device 102 and/or the computing resource service provider 294. That is, in some embodiments a user may provide some or all of the source code to the scanning service system 294, such as by uploading (e.g., via the API 292) the source code to a data store or data storage service (e.g., electronic data store 298) accessible by the scanning service system 294. In other embodiments, a service of the computing resource service provider 296 may provide the source code to the scanning service system 294, or may store the source code or otherwise make the source code accessible by the scanning service system 294. For example, a user of user computing device 102 may upload source code to be executed by the computing resource service provider 296 (e.g., as one or more portions of an application), and the computing resource service provider 296 may use the scanning service system 294 to perform a static analysis of that source code prior to execution.

The physical hardware implementing any of the physical, logical, and/or virtual computing resources, the computing resource service provider 296, and/or the scanning service system 294, may include one or more server computers (e.g., as described below in connection with FIG. 3).

The scanning service system 294 may enable users and other services of the computing resource service provider 296 to manage and operate analysis of various source code generated based at least in part on computing resources of the computing resource service provider 296, such as one or more virtual machines. In some embodiments, a desired static analysis may be initiated by receipt of a request. For example, a user computing device 102 may transmit a request to the scanning service system 294 for a particular analysis of one or more portions of source code. The request may be an API call including information corresponding to the requestor, the source code to be analyzed, identifying information of the source code to be analyzed (e.g., source code stored by the computing resource services system 294), etc. The scanning service system 294 may execute one or more portions of the processes described herein to perform a static analysis on the source code, provide results to a user of user computing device 102, generate and store (e.g., in the electronic data store 298) metadata for one or more portions of the source code, etc.

Figure 3:
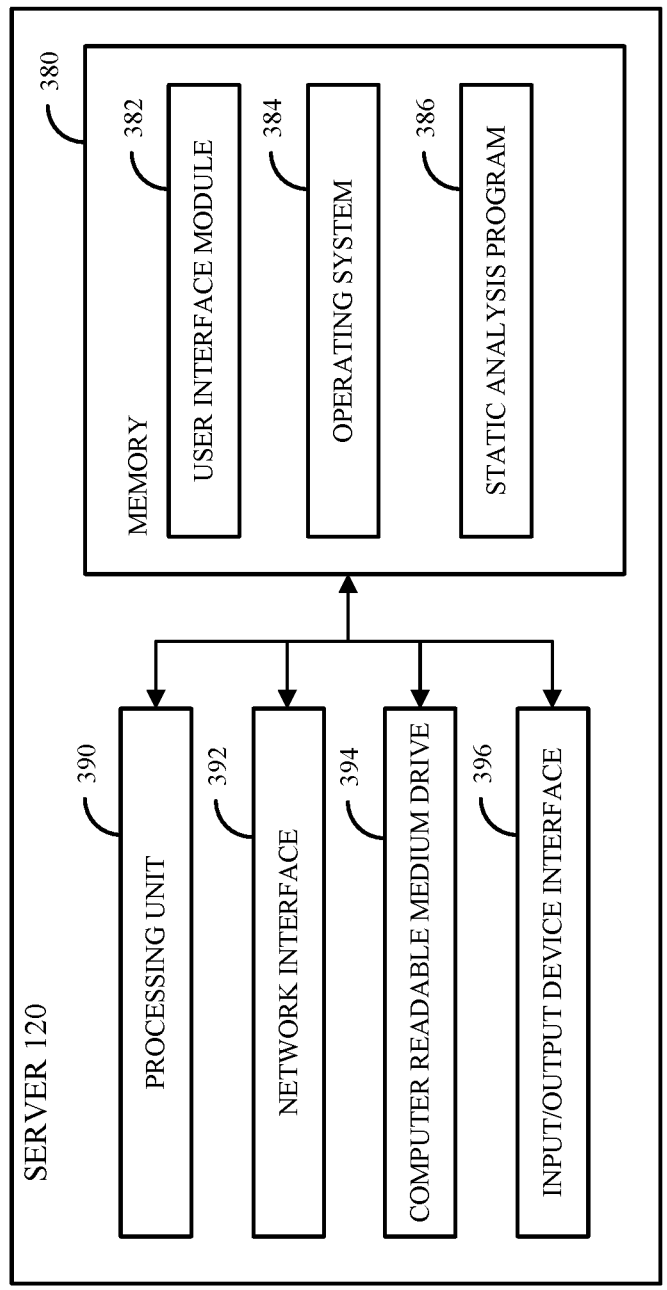
FIG. 3 is a block diagram of an exemplary computing device architecture providing a server for performing a static analysis using partial results from a previous analysis, in accordance with the present disclosure.

FIG. 3 depicts a general architecture of a computing system (referenced as server 120) that executes a static analysis and/or causes the network-accessible services system 210 to execute the static analysis and/or store metadata generated during the static analysis. The general architecture of the server 120 depicted in FIG. 3 includes an arrangement of computer hardware and software modules that may be used to implement aspects of the present disclosure. The hardware modules may be implemented with physical electronic devices, as discussed in greater detail below. The server 120 may include many more (or fewer) elements than those shown in FIG. 3. It is not necessary, however, that all of these generally conventional elements be shown in order to provide an enabling disclosure. Additionally, the general architecture illustrated in FIG. 3 may be used to implement one or more of the other components illustrated in FIGS. 1 and/or 2. As illustrated, the server 120 includes a processing unit 390, a network interface 392, a computer readable medium drive 394, and an input/output device interface 396, all of which may communicate with one another by way of a communication bus. The network interface 392 may provide connectivity to one or more networks or computing systems. The processing unit 390 may thus receive information and instructions from other computing systems or services via the network 204. The processing unit 390 may also communicate to and from memory 380 and further provide output information for an optional display (not shown) via the input/output device interface 396. The input/output device interface 396 may also accept input from an optional input device (not shown).

The memory 380 may contain computer program instructions (grouped as modules in some embodiments) that the processing unit 390 executes in order to implement one or more aspects of the present disclosure. The memory 380 generally includes RAM, ROM and/or other persistent, auxiliary or non-transitory computer-readable media. The memory 380 may store an operating system 384 that provides computer program instructions for use by the processing unit 390. The memory 380 may further include computer program instructions and other information for implementing aspects of the present disclosure. For example, in one embodiment, the memory 380 includes a user interface module 382 that generates user interfaces (and/or instructions therefor) for display upon a computing device, e.g., via a navigation and/or browsing interface such as a browser or application installed on the computing device. In addition, the memory 380 may include and/or communicate with one or more data repositories (not shown), for example, to access user program codes and/or libraries.

In addition to, in combination with, and/or in lieu of the user interface module 382, the memory 380 may include a static analysis program 386 that may be executed by the processing unit 390. In one embodiment, the user interface module 382 and the static analysis program 386 individually or collectively implement various aspects of the present disclosure, e.g., performing a static analysis of source code, generating metadata related to the execution of the static analysis, causing the metadata to be stored for use in later static analyses, using metadata generated during previous static analyses, etc. In some embodiments, server 120 may be used to execute the VM instances and/or any other suitable portions of the network-accessible services system 210.

Figure 4:
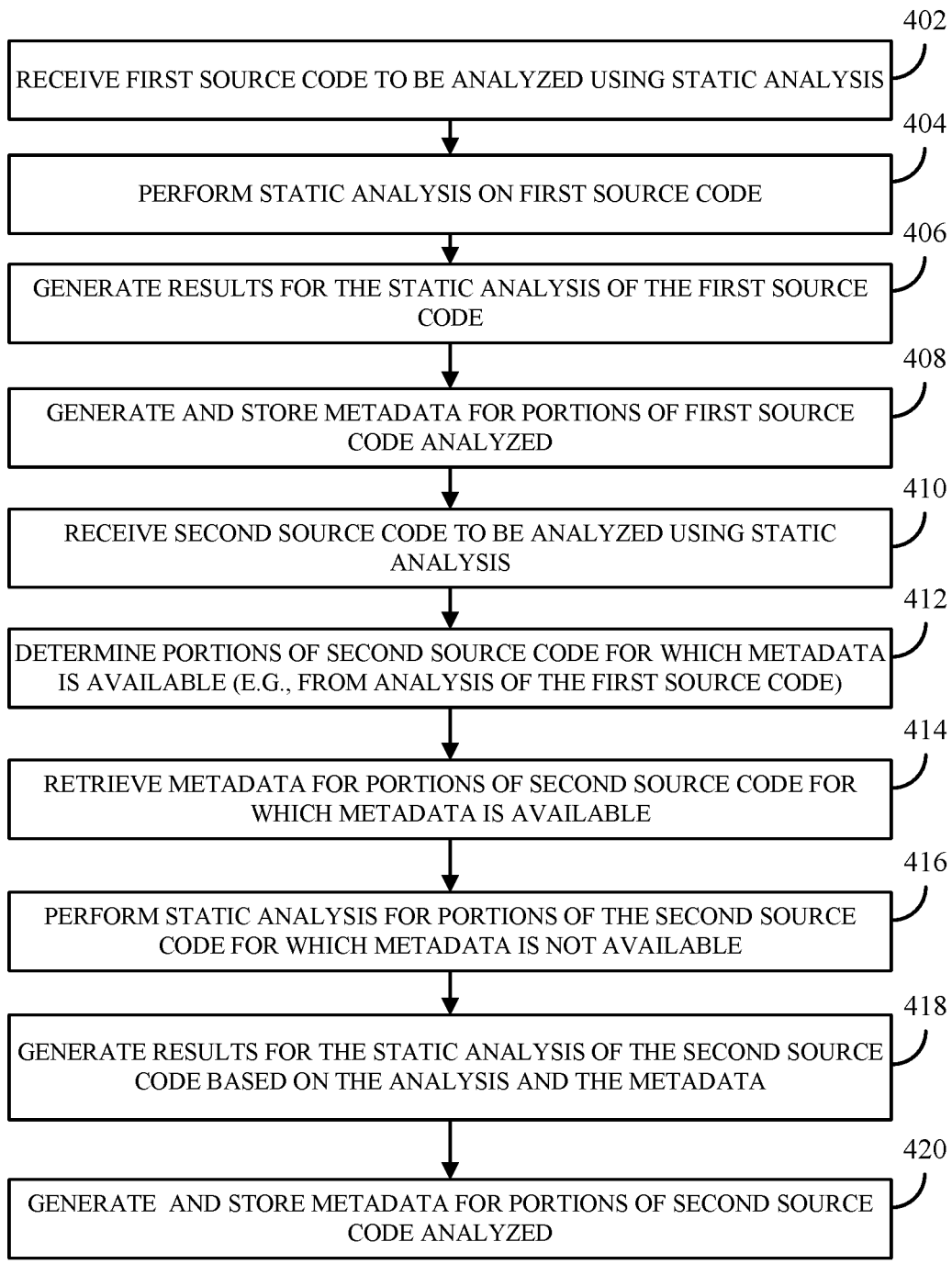
FIG. 4 is a flow diagram of an exemplary method for iteratively performing a static analysis of source code using partial results from a previous analysis, in accordance with the present disclosure.

Turning now to FIG. 4, a method 400 implemented by the components of the server 120 and/or the network-accessible services system 210, described above, iteratively performs static analyses using stored partial results from previous static analyses. At 402, the system may receive first source code corresponding to a first program to be analyzed using one or more static analysis techniques. As described above in connection with FIG. 1, the source code received at 402 can include any suitable source code corresponding to any suitable program or part of a program.

At 404, the system may perform a static analysis on the first source code using any suitable static analysis techniques or combinations of techniques. Non-limiting examples of such techniques include platform-specific and platform-agnostic testing and/or mitigation of Common Vulnerabilities and Exposures, type checking, alias determination, etc. The system of FIG. 2, for example, may perform lightweight static analysis of discrete functions to detect problems like buffer overflows, symbolic links, malformed input, file name problems, etc.; in various other embodiments, static analysis at any suitable level of comprehensiveness may be performed.

At 406, the system can generate results of the static analysis of the first source code for review by a user of the system (e.g., a developer). In some embodiments, the results can be formatted in any suitable format according to the analysis techniques applied, the file and operating systems of the target application(s), user-supplied parameters, and the like.

At 408, the system can generate and store metadata for portions of the first source code analyzed. For example, as described above in connection with FIG. 1, the system may create metadata for one or more portions of the source code that may be used in a subsequent static analysis where the source code includes the same portion or where the source code is unavailable. As described above in connection with FIG. 1, the metadata may include any suitable information related to the analysis of a particular portion of the first source code, and may be stored in association with a hash of the code snippet, which may be used to identify the code snippet.

At 410, the system may receive second source code to be analyzed using static analysis. In some embodiments, the second source code may be received from the same user computing device or a different user computing device.

At 412, the system may determine which portions of the second source code, if any, correspond to metadata that is available from previous static analyses. In some embodiments, the system may use any suitable technique or combination of techniques to determine whether a particular portion of the second source code corresponds to a portion of source code that has previously been analyzed to generate metadata that may be used in the current static analysis of the second source code. For example, the system may generate a hash of portions of the second source code (e.g., using the same hash that was used when generating the metadata) and compare the hash value to stored hash values. As another example, the system may receive hash values with the second source code that correspond to portions of the second source code. As yet another example, the system may receive the metadata with the second source code. In some embodiments, when the source code is unavailable to hash, no hash (or other unique identifying information) is associated with the source code, and no metadata is provided with the source code, one or more heuristics can be used to attempt to determine the behavior of the missing source code. For example, in some embodiments, the system may determine whether the missing source code has pointers to one or more other resources (e.g., functions, code libraries, etc.) for which the metadata is available. As another example, the system may use a semantic name (which may not be unique) to attempt to identify metadata for other similarly named portions of source code, and may compare other properties of the retrieved metadata to determine the likelihood that the retrieved metadata is relevant to the missing source code (e.g., by comparing inputs to the two portions of source code). As yet another example, the system may use default or generic metadata in the static analysis, which may be retrieved based on one or more properties of the missing source code that can be determined (e.g., the type of code that the missing source code references, the type of input that the code uses, the type of code that takes the output of the missing source code as an input, etc.).

In some embodiments, a determination of whether metadata for a particular portion of the second source code is available can be determined using any suitable technique or combination of techniques. For example, during the static analysis, at each function (or snippet, or any other suitable portion of the source code), the system may produce a hash value from the source code and use the hash value to determine whether that portion of the source code has available metadata. Additionally or alternatively, the system may hash each portion of the source code prior to commence the static analysis to produce hash values for each portion, and may attempt to retrieve any available metadata from previous analyses. In some embodiments, for portions of the source code that include semantically meaningful names (e.g., libraries, functions, etc.), the name may be used as a parameter of the query submitted to the electronic data store. It will be understood that the values used for comparison of the second user's code portion to the stored metadata, such as the hash values, filenames, etc., may produce exact matches in some embodiments; in turn, this may indicate that the first (i.e., previously analyzed) code portion is identical to the second code portion that is the subject of the query. In other embodiments, the system's queries may be designed to produce a match of the second source code portion to a previously analyzed code portion if the code portions are at least similar. For example, the system may operate according to a degree of confidence, wherein the second code portion is determined to be sufficiently similar to the previously analyzed code portion if a certain number of characters in the corresponding hash values for the two code portions match. In another example, only certain parts of the source code are used to generate the corresponding hash values; thus the hash values may be identical, signifying a match, as long as the parts of the source code in each portion that are used to generate the hash values are the same, even if other parts of the source code are different. In this example and other embodiments, the system may thus be capable of ignoring insignificant differences such as time stamps, coded comments, variable names and/or values, and the like.

At 414, the system may retrieve metadata for the portions of the second source code for which metadata is available. For example, the metadata may be retrieved from electronic data store 130 and/or electronic data store 280. At 416, the system may perform a static analysis for portions of the second source code for which metadata is not available. For example, the system may skip performing a full static analysis for portions of the second source code for which metadata has been retrieved. This may reduce the computing resources and time required to perform the static analysis of the second source code. As described above in connection with 404, the system may use any suitable technique or combination of techniques to perform the static analysis, and may use values included in the metadata (e.g., when a portion of the source code requires an input corresponding to the output of a snippet for which metadata has been retrieved).

At 418, the system may generate results of the static analysis of the second source code based on the analysis performed at 416 and the metadata retrieved at 414. At 420, the system may generate and store metadata for portions of the second source code that was analyzed at 416. In some embodiments, the metadata generated at 420 can be stored in the same electronic data store as the metadata generated at 408. In some embodiments, metadata for various code snippets that together make up a function may be combined to form metadata for the function. For example, if metadata for code snippets C1 and C2 were stored in the electronic data store, and a function includes code snippets C1, C2, and C3, after the system analyses code snippet C3 (e.g., at 416) and generates metadata for code snippet C3, the system may combine the metadata from all three code snippets and store it as metadata for the function. Although code snippets are generally described herein as portions of the code that are being analyzed, any suitable portion of code can be analyzed, such as functions which may include multiple code snippets.

Figure 5:
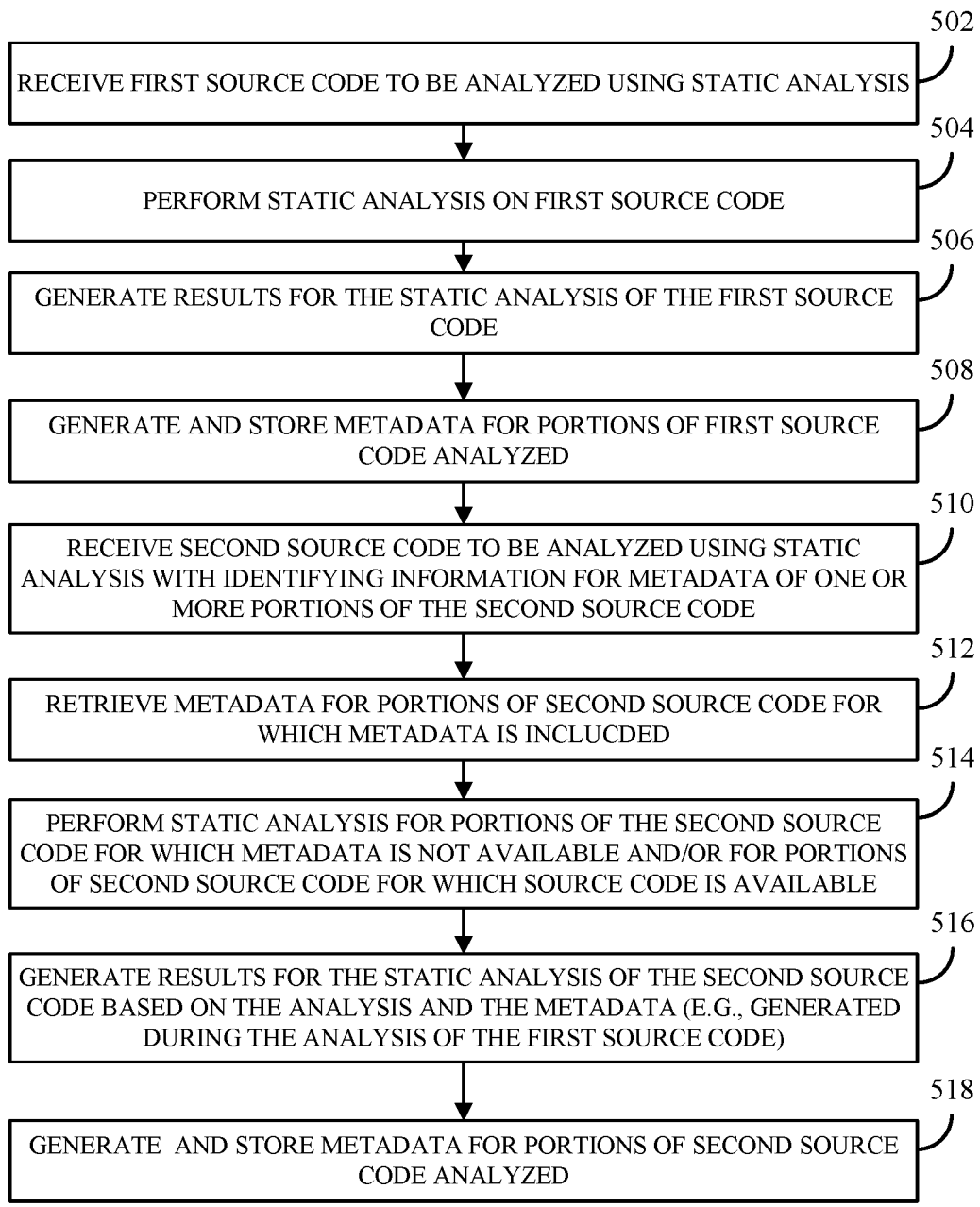
FIG. 5 is another flow diagram of an exemplary method performing a static analysis of source code using partial results from a previous analysis, in accordance with the present disclosure.

Turning now to FIG. 5, another method 500 implemented by the components of the server 120 and/or the network-accessible services system 210, described above, iteratively performs static analyses using stored partial results from previous static analyses. At 502, the system may receive first source code corresponding to a first program to be analyzed using one or more static analysis techniques. As described above in connection with FIG. 1, the source code received at 502 can include any suitable source code corresponding to any suitable program or part of a program.

At 504, the system may perform a static analysis on the first source code using any suitable static analysis techniques or combinations of techniques. Non-limiting examples of such techniques include platform-specific and platform-agnostic testing and/or mitigation of Common Vulnerabilities and Exposures, type checking, alias determination, etc. The systems of FIGS. 2A-B, for example, may perform lightweight static analysis of discrete functions to detect problems like buffer overflows, symbolic links, malformed input, file name problems, etc.; in various other embodiments, static analysis at any suitable level of comprehensiveness may be performed.

At 506, the system can generate results of the static analysis of the first source code for review by a user of the system (e.g., a developer). In some embodiments, the results can be formatted in any suitable format. At 508, the system can generate and store metadata for portions of the first source code analyzed. For example, as described above in connection with FIG. 1, the system may create metadata for one or more portions of the source code that may be used in a subsequent static analysis where the source code includes the same portion or where the source code is unavailable. As described above in connection with FIG. 1, the metadata may include any suitable information related to the analysis of a particular portion of the first source code.

At 510, the system may receive second source code to be analyzed using static analysis and identifying information for metadata of one or more portions of the second source code. For example, the identifying information can be a hash value of a portion of the second source code. As another example, the identifying information can be a hash value of a portion of source code for which code is not available, but is referenced in the second source code (e.g., a library that is retrieved at runtime). In some embodiments, the second source code may be received from the same user computing device or a different user computing device.

At 512, the system may retrieve metadata for the portions of the second source code for which metadata is included with the second source code. For example, the metadata may be retrieved from electronic data store 130 and/or electronic data store 280. At 514, the system may perform a static analysis for portions of the second source code for which metadata is not available. For example, the system may skip performing a full static analysis for portions of the second source code for which metadata has been retrieved. This may reduce the computing resources and time required to perform the static analysis of the second source code. As described above in connection with 504, the system may use any suitable technique or combination of techniques to perform the static analysis, and may use values included in the metadata (e.g., when a portion of the source code requires an input corresponding to the output of a snippet for which metadata has been retrieved).

At 516, the system may generate results of the static analysis of the second source code based on the analysis performed at 514 and the metadata retrieved at 512. At 518, the system may generate and store metadata for portions of the second source code that was analyzed at 514. In some embodiments, the metadata generated at 518 can be stored in the same electronic data store as the metadata generated at 508.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification is not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. A system, comprising:
an electronic data store; and
a static analysis system including a processor and memory, the memory including computer-executable instructions that upon execution cause the system to:
receive first source code including a first code snippet in connection with a request to perform a first static analysis of the first source code;
perform the first static analysis of the first source code including the first code snippet to produce a first result of the first static analysis of the first code snippet;
generate first metadata describing the first result;
apply a hashing function to the first code snippet to produce a first hash value;
store the first metadata in the electronic data store in association with the first hash value;
receive a second request to perform the first static analysis of second source code, the second source code including a second code snippet that is at least similar to the first code snippet; and
responsive to the second request:
query the electronic data store using a second hash value generated by applying the hashing function to the second code snippet to determine that the second hash value matches the first hash value;
responsive to the determination that the second hash value matches the first hash value, obtain the first metadata from the electronic data store; and
generate a second result of the first static analysis of the second source code, the second result incorporating the first metadata to describe the first static analysis of the second code snippet.

2. The system of claim 1, wherein the computer-executable instructions upon execution further cause the system to:
generate a third hash value by applying the hashing function to a third code snippet; and
store, in the electronic data store, the third hash value and second metadata in association with the third hash value, the second metadata corresponding to an intermediate result of the first static analysis of the third code snippet.

3. The system of claim 2, wherein the computer-executable instructions upon execution further cause the system to perform static analysis of the second source code including the third code snippet and the first metadata.

4. The system of claim 1, wherein the computer-executable instructions upon execution further cause the system to transmit the results to a user computing device associated with the second request.

5. A system, comprising one or more hardware computing devices configured to execute computer-executable instructions that upon execution cause the one or more hardware computing devices to:
receive a request to perform a static analysis of source code;
generate a hash value by applying a hashing function to a first portion of the source code;
query an electronic data store using the hash value;
receive a query result generated in response to the query, the query result indicating the hash value identifies first metadata representing a previously performed static analysis of the first portion;
based on the query result, retrieve the first metadata from the electronic data store; and
generate a result of the static analysis of the source code, the result incorporating the first metadata to represent the static analysis of the first portion of the source code.

6. The system of claim 5, wherein the source code includes a second portion of the source code, and wherein the one or more hardware computing devices are further configured to:
generate a second hash value by applying the hashing function to the second portion of the source code;
determine that the electronic data store does not include the second hash value;
perform the static analysis of the second portion of the source code to produce a second result;
generate second metadata representing the second result; and
store the second metadata in the electronic data store in association with the second hash value.

7. The system of claim 6, wherein the first portion and the second portion of the source code are part of a common function call.

8. The system of claim 5, wherein the source code includes a reference to a library, and wherein the one or more hardware computing devices are further configured to retrieve metadata for functions in the library from the electronic data store.

9. The system of claim 8, wherein source code for the functions in the library is not included in the source code.

10. The system of claim 5, wherein the computer-executable instructions upon execution further cause the one or more hardware computing devices to:
receive a second hash value in connection with the request to perform the static analysis of the source code, the second hash value produced by applying the hashing function to a second portion of the source code distinct from the first portion;
query the electronic data store using the second hash value;
receive a second query result generated in response to the query, the second query result indicating the second hash value identifies second metadata representing a previously performed static analysis of the second portion of the source code;
based on the second query result, retrieve the second metadata from the electronic data store; and
generate the result of the static analysis of the source code further incorporating the second metadata to represent the static analysis of the second portion of the source code.

11. The system of claim 5, wherein the source code includes a second portion of the source code, and wherein the computer-executable instructions upon execution further cause the one or more hardware computing devices to:
generate a second hash value by applying the hashing function to the second portion of the source code;
query the electronic data store using the second hash value;
responsive to the query using the second hash value, retrieve second metadata corresponding to a previously performed static analysis of previously analyzed code portion from the electronic data store, the previously analyzed code portion being at least similar to the second portion of the source code; and
use at least part of the second metadata to determine an input value for the first portion of the source code.

12. The system of claim 11, wherein the computer-executable instructions that upon execution further cause the one or more hardware computing devices to:
- determine that a function comprises the first portion and the second portion of the source code;
- use the first metadata and the second metadata to generate third metadata that represents a behavior of the function;
- generate a third hash value by applying the hashing function to the first and second portions of the source code; and
- store the third metadata in the electronic data store in association with the third hash value.

13. A method, comprising:
- receiving source code in connection with a request to perform a static analysis of the source code;
- obtaining a first hash value for a first portion of the source code using a processor that applies a hashing function to source code to produce a hash value;
- querying an electronic data store using the first hash value;
- receiving a query result generated in response to the query, the query result indicating the first hash value identifies first metadata representing a previously performed static analysis of the first portion;
- responsive to the query result, retrieving the first metadata from the electronic data store; and
- outputting to a device memory a result of the static analysis of the source code, the result incorporating the first metadata to represent the static analysis of the first portion.

14. The method of claim 13, further comprising:
- obtaining a second hash value for a second portion of the source code using the processor;
- querying the electronic data store using the second hash value;
- responsive to the query using the second hash value, receiving a null result;
- responsive to the null result, performing a static analysis of the second portion of the source code;
- generating second metadata corresponding to the static analysis of the second portion of the source code; and
- storing the second metadata in the electronic data store in association with the second hash value.

15. The method of claim 13, wherein the first portion and the second portion of the source code are part of a common function call.

16. The method of claim 13, wherein the source code includes a reference to a library, the method further comprising retrieving metadata for functions in the library from the electronic data store.

17. The method of claim 16, wherein source code for the functions in the library is not included in the source code.

18. The method of claim 13, further comprising:
- receiving a second hash value in connection with the request to perform the static analysis of the source code;
- querying an electronic data store using the second hash value;
- responsive to the query, retrieving second metadata corresponding to a previously performed static analysis of a previously analyzed code portion from the electronic data store; and
- performing the static analysis of the source code using the first metadata and the second metadata.

19. The method of claim 13, further comprising:
- obtaining a second hash value for a second portion of the source code using the processor;
- querying an electronic data store using the second hash value;
- responsive to the query using the second hash value, retrieving second metadata corresponding to a previously performed static analysis of a previously analyzed code portion from the electronic data store; and
- using at least part of the second metadata to determine an input value for the first portion of the source code.

20. The method of claim 13, further comprising:
- determining that a function comprises the first portion of the source code and a second portion of the source code;
- using the first metadata and second metadata corresponding to the second portion of the source code to generate third metadata that represents a behavior of the function;
- generating a third hash value by applying the hashing function to the first and second portions of the source code; and
- storing the third metadata in the electronic data store in association with the third hash value.

* * * * *